(12) United States Patent
Kimura et al.

(10) Patent No.: US 7,051,165 B2
(45) Date of Patent: May 23, 2006

(54) METHOD AND APPARATUS FOR A DATA SOURCE DEVICE WITH SHARED STORAGE FOR A PLURALITY OF CLIENTS

(75) Inventors: Shinji Kimura, Sagamihara (JP); Satoshi Oshima, Tachikawa (JP); Hisashi Hashimoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 352 days.

(21) Appl. No.: 10/648,252

(22) Filed: Aug. 27, 2003

(65) Prior Publication Data
US 2004/0186898 A1    Sep. 23, 2004

(30) Foreign Application Priority Data
Mar. 19, 2003   (JP) .............................. 2003-075187

(51) Int. Cl.
*G06F 12/00* (2006.01)
(52) U.S. Cl. ...................... 711/147; 709/203; 709/213; 709/217
(58) Field of Classification Search .................... None
See application file for complete search history.

(56) References Cited

U.S. PATENT DOCUMENTS

| | | | |
|---|---|---|---|
| 5,918,229 A | 6/1999 | Davis et al. | |
| 6,502,162 B1 | 12/2002 | Blumenau et al. | |
| 6,556,998 B1 | 4/2003 | Mukherjee et al. | |
| 2002/0087780 A1 | 7/2002 | Selkirk et al. | |
| 2004/0186961 A1 | 9/2004 | Kimura et al. | |
| 2005/0021727 A1* | 1/2005 | Matsunami et al. | ........ 709/223 |

FOREIGN PATENT DOCUMENTS

| | | |
|---|---|---|
| JP | 6-332716 | 12/1994 |
| JP | 2000-259583 | 9/2000 |
| JP | 2001-75853 | 3/2001 |

\* cited by examiner

*Primary Examiner*—Kevin Verbrugge
(74) *Attorney, Agent, or Firm*—Mattingly, Stanger, Malur & Brundidge, P.C.

(57) ABSTRACT

The technique of the present invention enhances reading speed of data from a disk device in a computer system capable of transmission and reception of the data via a node device 200 between a client 100 and a storage device 300. A share volume PDc and specific volumes PDa and PDb are defined in the disk device on the storage device 300. Common data among respective clients and specific data corresponding to the individual client are stored in the share volume and specified volumes, respectively. Once respective clients request virtual volumes VDa and VDb to read the data, the storage device reads out the corresponding data from the share volume or the specific volume. This application avoids lowering the reading speed regardless of the concentration of accesses from a plurality of clients because most data can be read from the share volume.

13 Claims, 8 Drawing Sheets

Fig.5

| User ID | Password | Virtual Volume | Attribute | IP Address |
|---|---|---|---|---|
| User A | ***** | VDa | Private | IPa |
| User B | ***** | VDb | Private | |
| User C | ***** | VDc | Shared | |
| | | | | |

334

METHOD AND APPARATUS FOR A DATA SOURCE DEVICE WITH SHARED STORAGE FOR A PLURALITY OF CLIENTS

BACKGROUND OF THE INVENTION

1. Field of the Invention

The present invention relates to a technique of controlling storage and read of data on a mass storage device, such as a storage device and a node device, which is accessed by a plurality of clients.

2. Description of the Related Art

A large scale computing system connecting with a plurality of client computers (Hereinafter referred to as a "client") via a network is typically constructed in companies. Such a computer system requires a mass storage device, what is called a storage device, to provide a variety of data and programs used for operations on respective clients. The storage device, which has a high capacity hard disk, enables users of clients to store and read out data and programs in the allocated area for themselves or in the shared area. One typical protocol to access to the storage device is SCSI (Small Computer System Interface). Recently, another protocol called iSCSI has been applied to divide a SCSI command into IP packets to be transmitted via a network. The use of iSCSI attempts to provide an environment where a greater number of clients or clients located in a remote place can access to the storage device.

One typical method for utilizing the storage device is a remote boot, that is, start-up of the client. In the case of the remote boot, an operating system required to the start-up and a variety of files, such as a configuration file are pre-stored in an area corresponding to the individual user on the storage device. Each client is capable of start-up with reading of these files from the storage device via the network.

When executing the remote boot, each client is not required to incorporate a hard disk but it is sufficient to have a ROM for storing relatively smaller boot program to achieve the access to the storage device. Unifying the management of the data on the storage device, instead of storing the data in the hard disk of each client, prevents important data from being lost or leaked even if the client is damaged or stolen, and thereby enhances the security. This application also has practical advantage that allows users to start up any client connected on the network with a certain setup proper to the user. Details of the remote boot has been disclosed in, for example, JP1994-332716A, JP2001-75853A, and JP2000-259583A.

In some cases, start-up operations at about the same time by a large number of clients cause the concentration of accesses to a storage device, which results in delay of file supply to a client, and thus takes a long time for the start-up. Some examinations by the inventor of this application have shown that simultaneous start-up operations by about 10 clients require long time, even to the extent that users feel inconvenient. Those problems thus typically occur in a company at start time of working hours when the start-up operations of clients tend to concentrate on.

One available application includes a node device, equipped with a cache memory, between clients and the storage device to reduce accesses to the storage device. In this system, the cached data in the node device may be supplied to clients without accessing to the storage device, and thus reduces the number of accesses to the storage device. Such a system, however, still has a problem of the start-up delay because of the concentration of accesses to the node device when a plurality of clients are attempting to execute the start-up.

The above-mentioned problem is not limited to the case of the remote boot or the storage device and the node device but similar problem arises in the process of reading of the data with a diversity of memory devices capable of receiving accesses from a plurality of clients.

SUMMARY OF THE INVENTION

The present invention addresses to keep quick supply of the data from a memory device regardless of the concentration of accesses on the memory device from a plurality of clients. A data source device of the present invention provides the data stored in a disk device, in response to requests from a plurality of clients. Typical examples of the data source device include a storage device, a node device or the like.

The disk device, which is incorporated in the data source device of the present invention, includes a share volume with specified capacity that is used in common among the plurality of clients, and a plurality of specific volumes that are segmented one another, each of which is associated with one of the plurality of clients. The data source device allocates a virtual volume to the individual client in addition to the share volume and specific volumes. Virtual blocks are prepared in the virtual volume as supposedly defined data storage area, which are used for transmission and receipt of the data from and to the client. The data source device also manages association between the virtual blocks and physical blocks, which are specified relating to the share volume and the specific volume.

In accordance with the present invention, the logical management unit of virtual blocks may be defined in various manners. The client, for example, may be regarded as the logical management unit; the computer as a hardware connecting to the data source device; the user utilizing each computer; or the user preference. In the case where the unit is defined by the computer, a certain environment may be provided for respective computers regardless of which user utilizes the computer. In the case where the unit is defined by the user, the environment specified to the user may be provided regardless of which computer is utilized. In the case where the unit is defined by the user, respective users may distinctively use a plurality of environments. Hereinafter, the term "client" will be used to indicate logical management unit of virtual blocks while the term "computer" will be used to indicate a client computer as a hardware unit.

A read out command of the data is transmitted from the client to the data source device involving specification of the virtual blocks. The data source device reads out the data corresponding to the virtual blocks specified by the read out command, from the specific volume or the share volume associated with the client, based on the above association. The client may be identified, based on address information specifying the computer or ID information specifying the user and his environment.

In accordance with the data source device of the present invention, the data may be stored in the share volume and the specific volume, separately. Although the data is thus separately stored, the use of the virtual volume allows the client to access to the data regardless of the distinction between the share volume and the specific volume.

In the disk device, reading speed of the data is generally affected by the physical moving distance of a reading head.

In accordance with the data source device of the present invention, the above method for storing data enables the data, which the plurality of clients read out in common, to be managed in the share volume. This application reduces the moving distance of the head during reading the data stored in the share volume regardless of the concentration of accesses from the plurality of clients, and thus avoids lowering of the reading speed of the data. In the present invention, the disk device may include either a single share volume or multiple share volumes, however, a single share volume is preferred in the light of keeping the reading speed.

The share volume preferably stores the data on which accesses from the plurality of clients may concentrate. For example, the share volume may store the data to be provided for respective clients at the remote boot, such as files of an operating system when the remote boot of the client is executed with using the data source device. In a specified system for executing particular operations in the company, the share volume may store application programs dedicated to those operations.

The share volume may store not only the data, which is commonly provided for the plurality of clients, but any specific data of one of the clients. Imagine one typical example case where some clients operate accounting and others operate production management in the same company. Each client starts an application for the accounting or an application for the production management at the start-up. In such a case, those application programs are preferably stored in the share volume, thereby allowing respective clients to read them simultaneously at the start time.

In the present invention, virtual blocks of different clients may be associated with uniform share blocks. This application allows respective clients to read out the data from the uniform share blocks. A single set of the data provided in common among a plurality of clients may thus be stored in the share volume, and thereby avoids the inclusion of duplicate data.

The data source device of the present invention may be applied to a computer system with a node device that is connected between the data source device and the plurality of clients and relays the data between them. The data being relayed is cached in the disk device in the node device. The data stored in the share volume and the data stored in the specific volume on the data source device are preferably processed separately in the case of the node device, in order to prevent lowering of the reading speed of the cached data.

The data source device may output specific information to the node device, wherein the specific information is used to judge the volume in which respective data are stored, the share volume or the specific volume, and thereby enables the above process on the node device. One example of the specific information includes mapping between a virtual block and a physical block. The specific information attached to each data may include a flag indicating the volume in which the data is stored, the share volume or the specific volume.

A variety of settings are available for the schedule to transmit the specific information from the data source device to the node device. One example of the schedule may include a predetermined timing independent of the read out command, such as the timing of the start-up of the node device. In this case, it is preferable to output the specific information regarding the plurality of virtual blocks together. The node device thus requires no confirmation as to which volume the data is stored in, the share volume or the specific volume, in response to receipt of the read out command from the client, and thereby simplifies the reading process.

In accordance with another aspect, the schedule may be set at the timing when the node device requests the data source device to send the specific information with the virtual block specified. The data source device responds the specific information about the specified virtual block. The specific information may be transmitted independently, or may be transmitted attached to the data stored in the specified block. In this application, the node device is not required to manage the specific information about the non-cached data, and thus saves the hardware resource and reduces the load for managing.

Since the specification information is used to associate the virtual block with the physical block of each client, the specific information depends on the client. The data source device may transmit the specific information corresponding to the specific client only to the node device used by the specific client, or to the plurality of node devices regardless of whether or not the specific client utilizes. The former case can omit useless communication thereby reducing the traffic of the communication. Also, the node device is released from management of such useless information. The latter case advantageously enables the use of the previous specific information even if the user utilizes the computer connected with another node device.

The present invention is also directed to the node device. The node device may substantially apply the same configuration as the data source device except for the function of relaying the data between the data source device and the client. In this light, the node device of the present invention may be regarded as one embodiment of the data source device; that is, a data source device capable of receiving the data from upper data source devices and provide the data for clients. For convenience of explanation, a device supplying the data is referred to as a "data source device", a device with the relay function is referred to as a "node device", and a physical block in the node device is referred to as a "cache block" hereinafter.

The same configuration as the data source device is applicable to the node device of the present invention, and the application enable the node device to read out the data corresponding to the virtual block, which is specified by the client, from either the share volume or the specific volume. The node device also caches the data, which is received from the data source device, in either the share volume or the specific volume, separately.

To attain the above cache function, the present invention is directed to the node device that transmits a read out command of the data, which is specified by the client, to the data source device when the data is not stored in the disk device on the node device. The node device also receives the specified data and the specific information indicating the volume in which the data is stored, the share volume or the specific volume. The node device also forwards the received data to the client, and stores the data in the share volume or the specific volume, based on the specific information. In addition, the node device updates the mapping between the virtual block and the cache block on the node device depending on the storage location, that is, the block where the data is stored.

The specific information is preferably used to specify the commonality of the data between the virtual block and other virtual blocks as well as the storage location. This application enables the node device to determine the commonality among virtual blocks that are specified with read out commands from respective clients, and thereby judges whether or not the data has been cached. The node device can omit cache process to the data that has already been cached, and thus saves the hardware resource in the node device.

Such specific information may be acquired at a variety of schedules. For example, the node device may request the data source device to output the specific information prior to the transmission of the read out command from the node device to the data source device. This application enables the confirmation as to whether or not the data has been cached before receiving the data, and thereby reduces the traffic. The specific information acquired through those processes may be managed in the node device to judge whether or not the data has been cached. The node device may acquire the specific information from the data source device to be managed in advance.

The specification information may include the mapping between the virtual block and the physical block in the data source device. The association may be equivalent to the information, which is stored in the data source device to manage the storage location of the data. The specific information enables the node device to indirectly map the virtual block with the cache block in the case where the node device manages the mapping between the physical block and the cache block. This application enables the direct use of the information stored in the data source device for the judgment as to whether or not the data has been stored and cached.

Embodiments of the present invention described herein are not restrictive but there may be many modifications, changes, and alterations. The technique of the present invention is not restricted to the applications of the data source device and the node device discussed above, but may be actualized by a diversity of other applications, such as a computer system to which these devices are connected and control methods of the data source device, the node device and the computer system. The technique of the present invention is also attained by a computer program or the recording medium in which such a computer program is recorded. Typical examples of the recording medium include flexible disks, CD-ROMs, DVDs, magneto-optic discs, IC cards, ROM cartridges, punched cards, prints with barcodes or other codes printed thereon, internal storage devices (memories like a RAM and a ROM) and external storage devices of the computer, and a variety of other computer readable media.

BRIEF DESCRIPTION OF THE DRAWINGS

FIG. 5 schematically illustrates the structure of the user management table 334;

DESCRIPTION OF THE PREFERRED EMBODIMENTS

Figure 1:
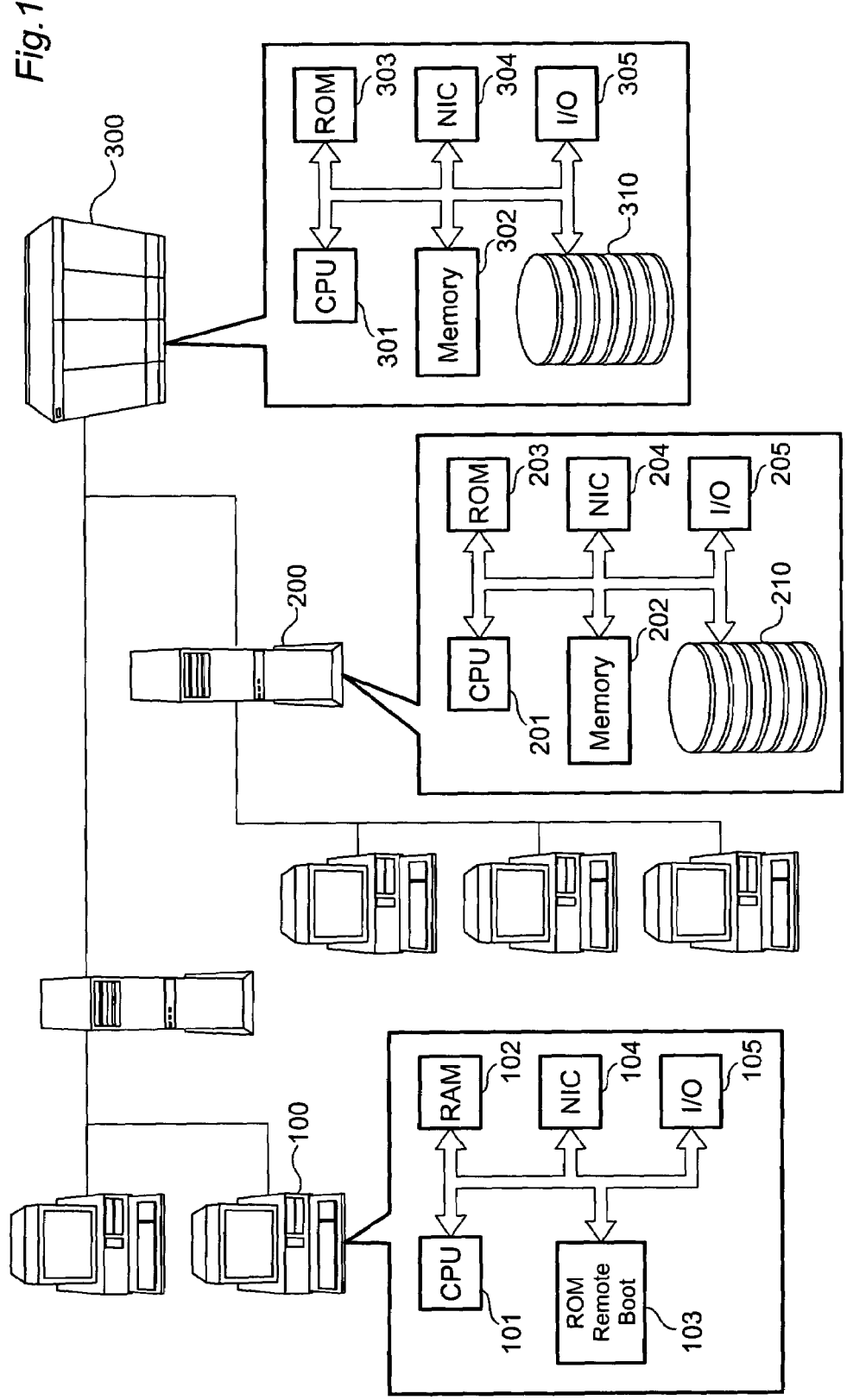
FIG. 1 schematically illustrates the construction of a computer system in accordance with an embodiment.

Some modes of carrying out the invention are discussed below as embodiments in the following order:
A. Construction of System
B. Data Storage Status
C. Functional Blocks
D. Data structure of Table
E. Process of Read of Data
F. Modifications
A. Construction of System FIG. 1 schematically illustrates the construction of a computer system in accordance with an embodiment. In this computer system, a storage device 300 is connected with a plurality of node devices 200 and computers 100 via a network where IP packets can be transmitted and received. Applicable examples of the network include a LAN (Local Area Network), an intranet and an internet.

The storage device 300 is integrated in the system as a computer with a hardware configuration as illustrated, which is capable of providing the data stored in a mass disk device 310 with respective computers 100 via the node device 200. Each computer 100 is capable of storing the data in the hard disk device 310. A NIC (Network Interface Card) 304 is an interface to transmit and receive the data via the network. An I/O 305 is an interface for input and output devices.

In the storage device 300, a CPU 301 controls transmission and receipt of the data according to a control program, which is stored in the disk device 310 and a ROM 303. A memory 302 is a main memory, which is used while this program is running.

The node device 200 is integrated in the system as a computer with the hardware configuration as illustrated, and functions to relay the data between the storage device 300 and the computer 100. The relayed data is cached, that is, temporally stored by means of the disk device 210 and the memory 202. A NIC (Network Interface Card) 204 is an interface to send and receive the data via the network. An I/O 205 is an interface for input and output devices.

In the node device 200, the CPU 201 performs relay control and cache control of the data, according to a control program, which is stored in the disk device 210 and a ROM 203. The memory 202 is a main memory, which is used while this program is running.

The computer 100 is a diskless computer without a hard disk, which incorporates a CPU 101, a RAM 102, a ROM 103, a NIC 104 and an I/O 105. The computer 100 executes a remote boot with reading of files required for start-up, such as an operating system, from the storage device 300. The ROM 103 pre-stores a remote boot program.

The program for controlling operations on the storage device 300, the node device 200 and the computer 100 may be provided for the storage device by means of a storage media, such as a CD-ROM.

B. Data Storage Status

Figure 2:
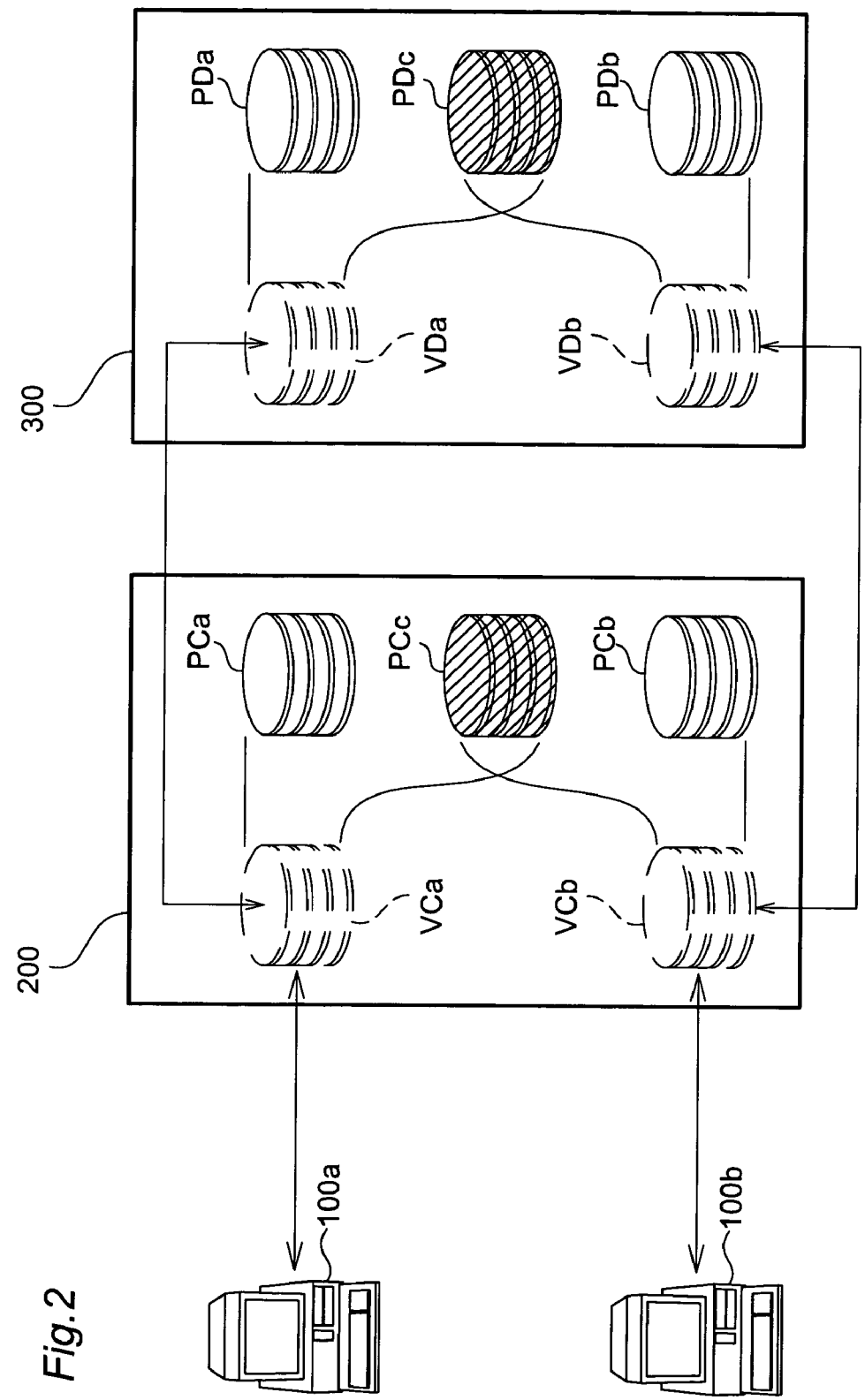
FIG. 2 is an exemplary diagram illustrating status of storing and reading of data.

FIG. 2 is an exemplary diagram illustrating status of storing and reading of the data. Two clients 100*a* and 100*b* are connected with the system. The terms "client", used for clients 100*a* and 100*b*, does not merely represent a computer with the hardware configuration but includes the status with fixed users.

Virtual volumes VDa and VDb corresponding to clients 100*a* and 100*b*, respectively, are defined in the storage device 300. Virtual volume VDa and VDb are not the physical area set in the disk device 310 on the storage device 300 but the logical disk to manage the data of respective clients. The physical area in the disk device 310 defines specific volumes PDa and PDb, which are allocated to clients 100a and 100b, respectively, and a share volume PDc, segmented by partitions. As shown in the figure, the virtual volume VDa is allocated to the specific volume PDa and the share volume PDc, and the virtual volume VDb is allocated to the specific volume PDb and the share volume PDc. Hereinafter, the storage location of the data in virtual volumes VDa and VDb are referred to as a virtual block, and the storage location of the data in the disk device 310 is referred to as a physical block.

Virtual volumes VCa and VCb corresponding to clients 100a and 100b, respectively, are defined in the node device 200 as well. The physical area in the disk device 210 on the node device 200 defines specific volumes PCa and PCb, which are allocated to clients 100a and 100b, respectively, and a share volume PCc, which are shared by both clients. As shown in the figure, the virtual volume VCa is allocated to the specific volume PCa and the share volume PCc, and the virtual volume VCb is allocated to the specific volume PCb and the share volume PCc. Hereinafter, the storage location of the data in the disk device 210 on the node device 200 is referred to as a cache block.

The client 100a transmits the read out request of the data with the virtual block specified, to the node device 200 at a variety of schedules, such as at the timing of the remote boot. The node device 200 confirms as to whether or not the specified data has been cached in the virtual volume VCa. If the data has been cached, the node device 200 reads out the data from the specific volume PCa or the share volume PCc corresponding to the virtual volume VCa and sends the data to the client 100a.

If the data has not been cached in the virtual volume VCa, the node device 200 transmits the read out command to the storage device 300. The storage device 300 reads out the data corresponding to the virtual block, which is specified by the read out command, from the specific volume PDa or the share volume PDc and sends the data to be sent to the node device 200. The node device 200 sends the data to the client 100a and stores the data in the specific volume PCa or the hare volume PCc corresponding to the virtual volume VCa. The read out command from the client 100b is processed in the similar manner.

Figure 3:
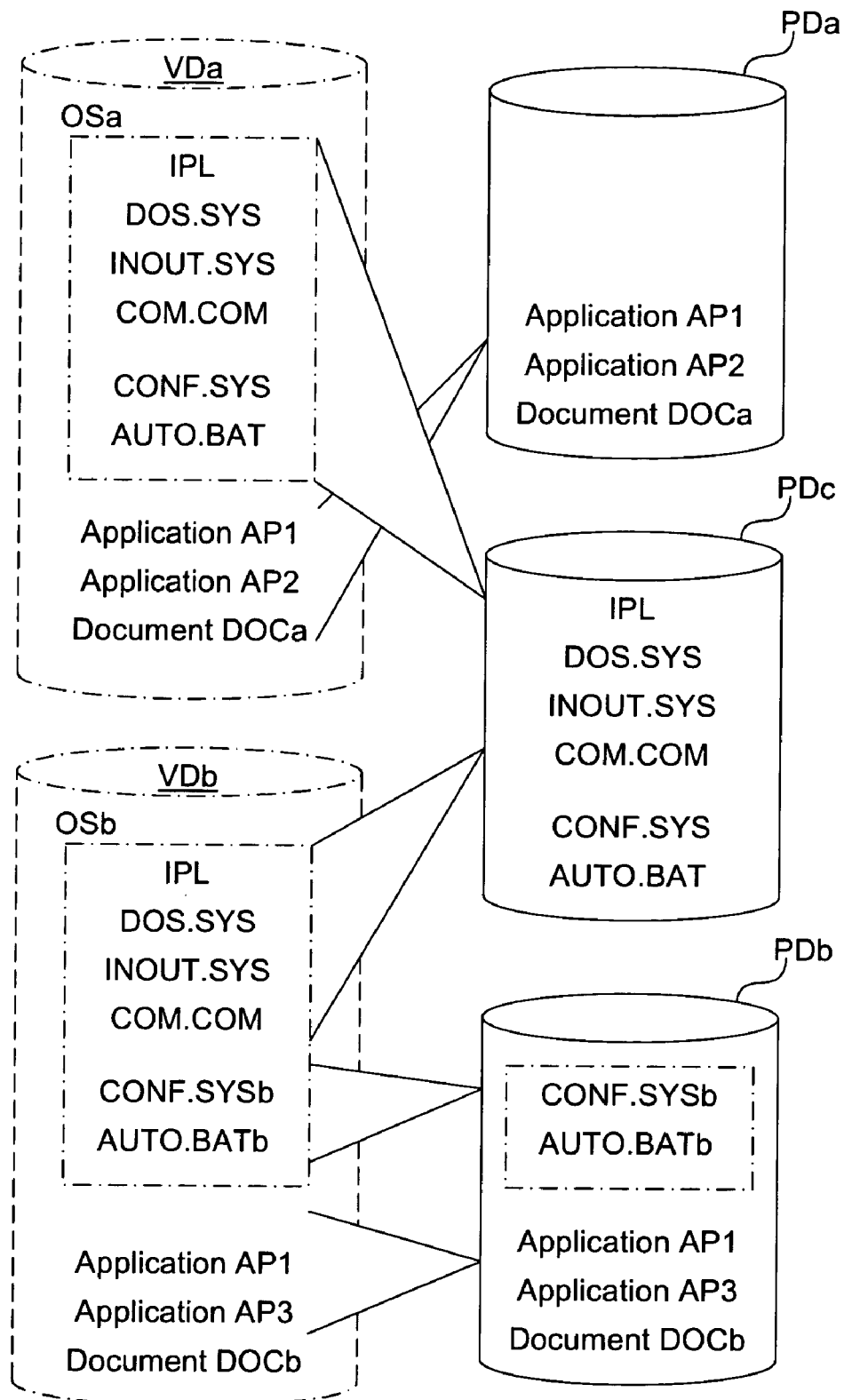
FIG. 3 is an exemplified diagram that illustrates storing of the data.

FIG. 3 is an exemplified diagram illustrating the storage of the data. In the left of FIG. 3, the virtual volume VDa, which is managed in the storage device 300, and files stored in the VDb are shown. In the right, files stored in specific volumes PDa and PDB, and the share volume PDc are shown. The virtual volume VDa stores files used for an operating system OSa, which is running on the client 100a, as well as a diversity of application programs and document data. The operating system OSa includes six files as illustrated. "IPL, DOS.SYS, INOUT.SYS, COM.COM" are files that are independent of the user preference and "CONF.SYS" and "AUTO.BAT" indicate the default setup. The virtual volume VDb stores files or the like used for the operating system OSb, which is running on the client 100b. Setup files, CONF.SYSb and AUTO.BATb in the operating system OSb, are different from those in the operating system OSa.

In accordance with the present embodiment, specific files are stored in specific volumes PDa and PDb in respective clients, and share files are stored in the share volume PDc. Application programs "Application1" and "Application2", and a document file DOCa among files, which the client 100a stores in the virtual volume VDa, are substantially stored in the specific volume PDa. Six files for the operating system OSa are stored in the share volume PDc to be shared.

Application programs "Application1" and "Application3", and a document file DOCb among files, which the client 100b stores in the virtual volume VDb, are substantially stored in the specific volume PDb. Files without depending on the setup among six files for the operating system OSb are stored in the share volume PDc. Files "CONF.SYSb" and "AUTO.BATb" indicating the setup, which are referred to as specific files to the client 100b, are stored in the specific volume PDb.

A variety of settings are available for the classification of the data to be stored in specific volumes PDa and PDb or the share volume PDc. For example, files "CONF.SYS" and "AUTO.BAT", which indicate the default setup, may be referred to as specific files to the client 100a that are stored in the specific volume PDa. In another setting, all the files to be used for the remote boot may be stored in the share volume PDc including CONF.SYSb and AUTO.BATb, which indicate the setup for the client 100b. In yet another applicable setting, the application program "Application1", which is shared by the client 100a and a client 100b, may be stored in the share volume PDc.

C. Functional Blocks

Figure 4:
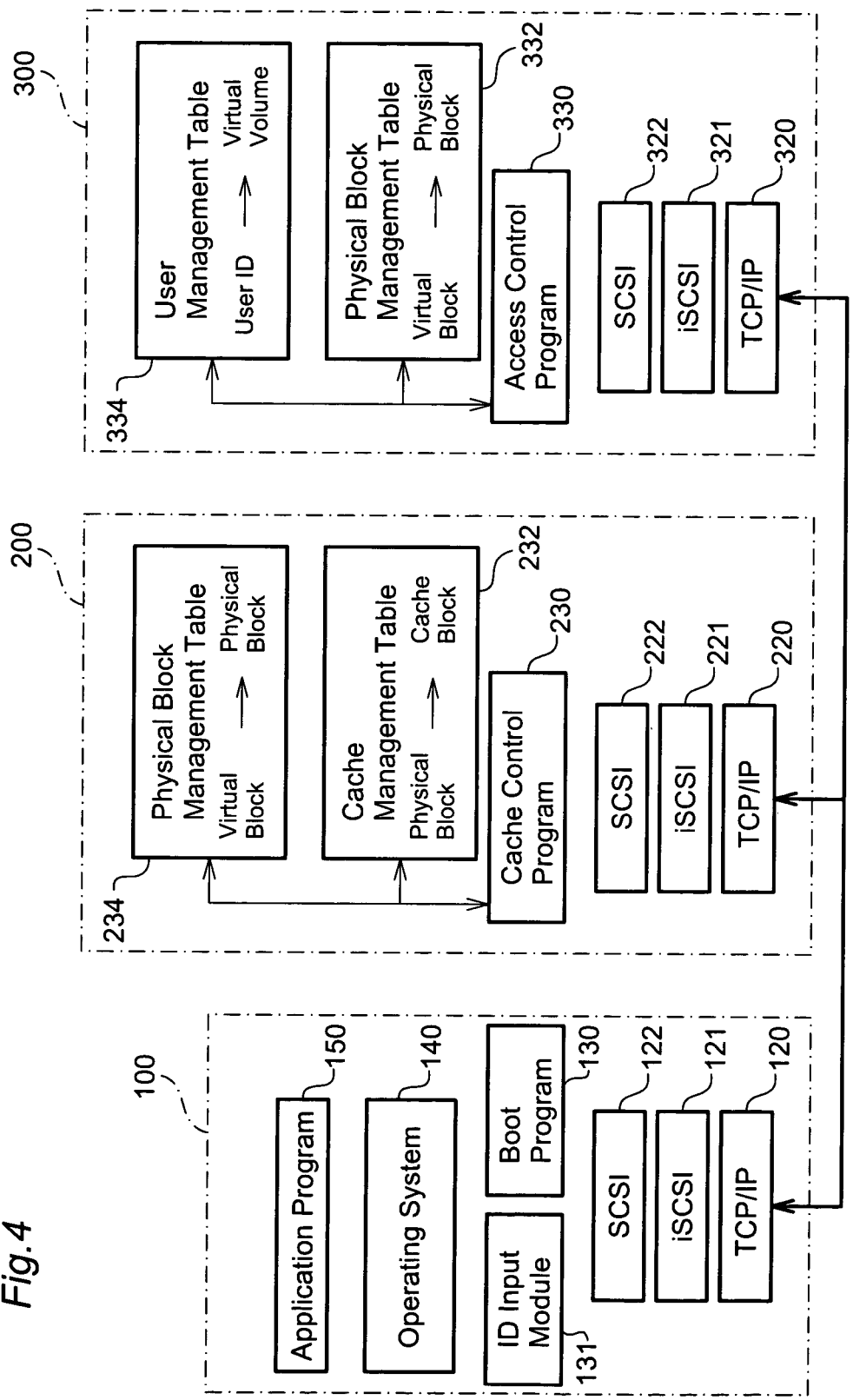
FIG. 4 shows functional blocks of respective devices in a computer system.

FIG. 4 shows functional blocks of respective devices in the computer system. The respective functional blocks are actualized by software with an installation of a computer program in this embodiment. The respective functional blocks may also be actualized by hardware configuration.

Functional blocks of the computer system 100 will be explained as below. A TCP/IP module 120 transmits IP packets via the network. A SCSI module 122 transmits and receives a read out command and a write command to and from the storage device 300. An iSCSI module 121 executes conversion between a SCSI command and IP packets, thus enables the SCSI command to be transmitted and received via TCP/IP. A boot program 130 executes the remote boot in the computer 100. The boot program 130 functions to initialize the computer 100, read files required to the start-up, such as the operating system, and boot these files. An ID input module 131 inputs an user ID and a password and transmits those information to the storage device 300 at the remote boot. In accordance with this embodiment, these modules carry out respective functions with the program stored in the ROM 103.

Upon completing the remote boot with respective functional blocks as discussed above, the operating system 140 in the computer 100 is started up in response to receipt of the file, which are transmitted from the storage device 300. An application 150 to be used in respective process on the computer 100 is provided by the storage device 300 and runs on the operating system 140.

The node device 200 includes a TCP/IP module 220, an iSCSI module 221 and a SCSI module 222 in order to send and receive the SCSI command via the network. The application running on the predetermined operating system, which is installed in the node device 200, achieves a cache control program 230.

The cache control program 230 controls the cache operation in the node device 200, with reference to a physical block management table 234 and a cache management table 232. The physical block management table 234 is provided for mapping a virtual block, that is, the data storage location in the virtual volume with a physical block, that is, the data storage location in the storage device 300. The cache management table 232 is provided for mapping the physical block with the cache block, that is, data storage location in the node device 200. The data structure of these tables will be discussed below. Sequential reference of the physical block management table 234 and the cache management table 232 enables the mapping between the cache block and the virtual block.

The storage device 300 includes the TCP/IP module 320, the iSCSI module 321 and the SCSI module 322 in order to send and receive the SCSI command via the network. The application running on the predetermined operating system, which is installed in the storage device 300, achieves an access control program 330.

The access control program 330 controls reading and writing of the data in the disk device 310, with reference to a user management table 334 and a physical block management table 332. The user management table 334 is provided for associating the user ID with the virtual volume. The physical block management table 332 is provided for mapping the virtual block with the physical block. The access control program 330 acquires the user ID from the computer 100 at the start-up of the computer 100. The virtual volume corresponding to the user is allocated to the computer 100 referring to the user management table 334 based on the user ID. The status, to which the virtual volume is specified, is herein referred to as a "client".

The access control program 330 is subsequently allowed to control the reading and the writing of the data in the virtual block in the disk device 310, which is specified by the client, with reference to the physical block management table 332.

D. Data Structure of Table

FIG. 5 schematically illustrates the structure of the user management table 334. The user management table 334 manages the user ID, the password, the virtual volume, the attribute and the IP address, being associated one another. The attribute indicates as to whether or not any other user accesses to the virtual volume. "Private" means the status where no other users are permitted access while "shared" means that other users are permitted access. IP address is varied depending on the computer where the user logs on. The attribute and the IP address may be optical items on the user management table 334.

Figure 6:
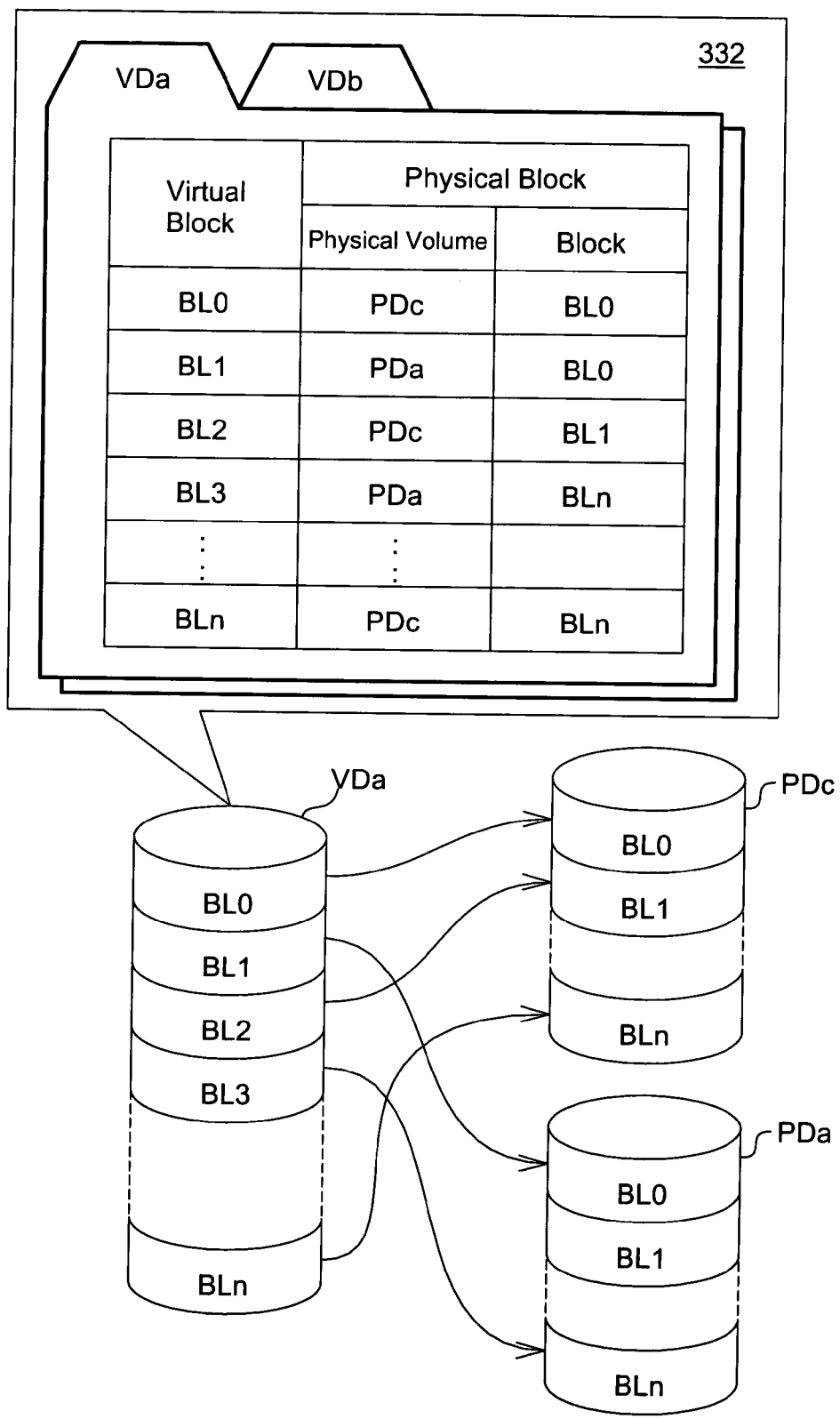
FIG. 6 schematically illustrates the structure of a physical block management table 332.

FIG. 6 schematically illustrates the structure of the physical block management table 332. The upper portion and the lower portion of FIG. 6 show the data structure and exemplary mapping between the virtual block and the physical block, respectively. As described previously, the physical block management table 332, which indicates the mapping between the virtual block and the physical block, is stored in each virtual volume. As shown in FIG. 6, the table is associated with the virtual volume VDa. This table stores physical blocks in which the actual data is stored relating to virtual blocks BL0–BLn in the virtual volume VDa. The physical block is defined by combination of the physical volume and the block number.

The exemplified table corresponds to the exemplary association shown below in the figure. In accordance with the figure, the data in the virtual block BL0 is stored in the block BL0 on the share volume PDc. Similarly, respective data in virtual blocks BL1–BLn are stored in the share volume PDc or the specific volume PDa. Referring to this table enables the data corresponding to the virtual block, which is specified by the client, to be read out from the share volume PDc or the specific volume PDa. The physical block management table 332 records the data corresponding to the virtual block VDb in the same format. Blocks in the share volume PDc and the specific volume PDb are allocated to the virtual block VDb. Blocks in the share volume PDc may be associated with both virtual blocks VDa and VDb. This association enables a plurality of clients to share the data in the share volume PDc.

The physical block management table 234 on the node device also stores the data in the same format. The node device may manage information regarding all the data stored in a physical block management table 234 on the storage device 300 or only part of information regarding the cached data.

Figure 7:
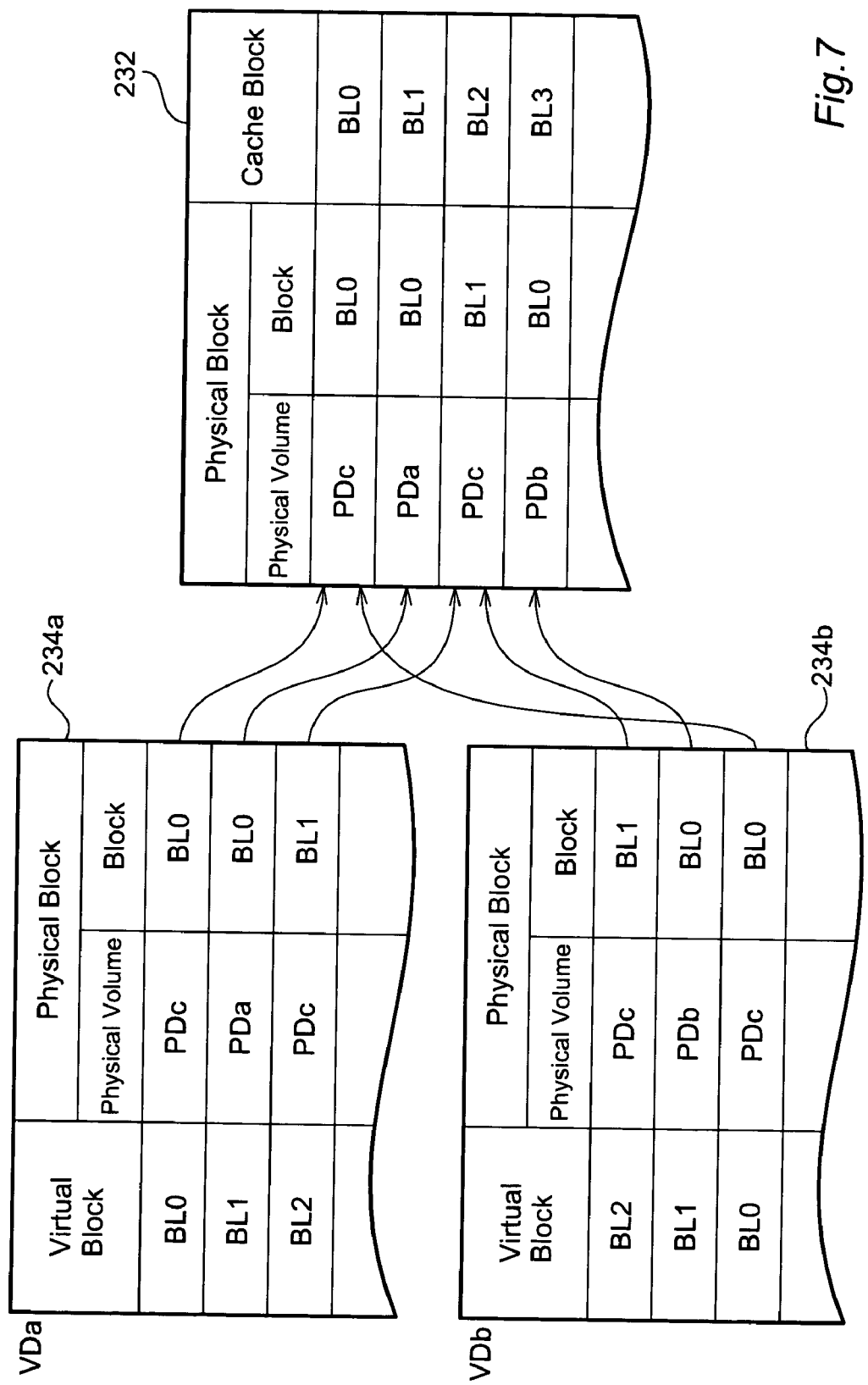
FIG. 7 schematically illustrates the structure of a cache management table 232.

FIG. 7 schematically illustrates the structure of the cache management table 232. As shown in the right of FIG. 7, this table presents mappings between the physical blocks in the storage device 300 and the cache block in the node device 200. The physical block is specified by the combination of the physical volume and the block number.

In the left side of FIG. 7, physical block management tables 234*a* and 234*b* are shown, which are associated with virtual volumes VDa and VDb, respectively. The node device 200 may specify the storage location of the data corresponding to the virtual block, with reference to physical block management tables 234*a* and 234*b*, and the cache management table 232. For example, the virtual block BL0 in the virtual volume VDa is determined to be the data corresponding to the block BL0 in the physical volume PDc, based on the physical block management table 234*a*. Then, referring to the cache management table 232 shows that the block BL0 in the physical volume PDc is stored in the cache block BL0.

In accordance with exemplification in FIG. 7, the cache block is allocated regardless of the physical volume. The share volume PCc and specific volumes PCa and PCb are also defined in the node device 200, and thereby enables the data to be stored therein separately. For example, the data, which is stored in the share volume PDc on the storage device 300, may be stored in the share volume PCc, and the data, which are stored in specific volumes PDa and PDb, may be stored in specific volumes PCa and PCb, respectively.

In accordance with another embodiment, the specific volume may store the data regardless of the client. For example, the storage device 300 may store the data in a uniform specific volume without distinction between the data stored in the specific volume PDa or that in PDb.

E. Process of Read of Data

Figure 8:
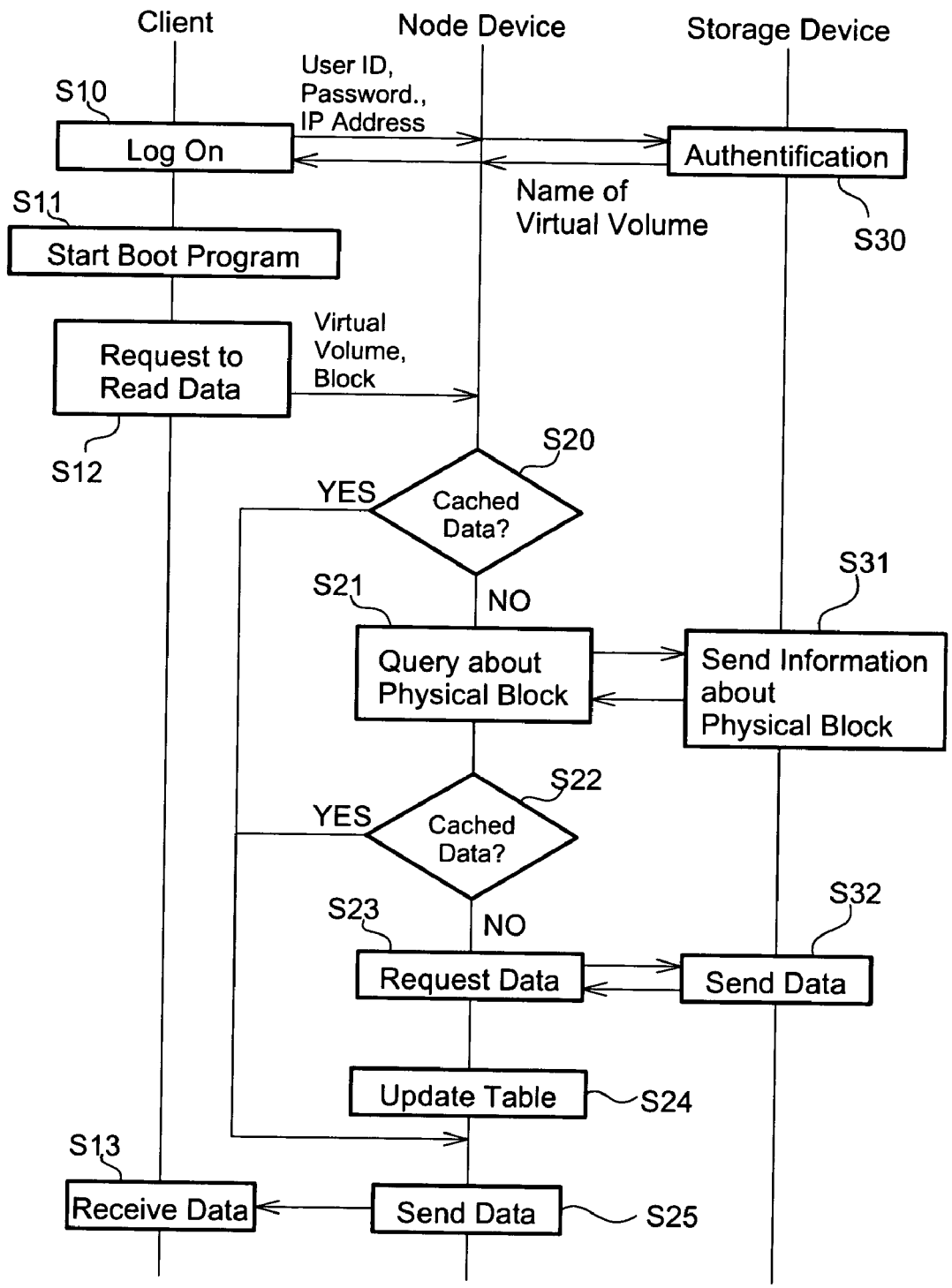
FIG. 8 is a flow chart illustrating process of read of the data.

FIG. 8 is a flow chart illustrating process of read of the data, which shows process at the remote boot on the client 100 in the left side, the node device 200 in the center and the storage device 300 in the right side.

When the user turns on the computer, the ID input module 131 presents an input window for entering user information, such as the user ID and the password. Once the user logs on by inputting the user ID and the password, the client 100 transmits the entered information to the node device 200 and the storage device 300 with the IP address of the client 100 (Step S10). The storage device 300 refers to the user management table 334, based on those information, and then determine whether the user is authentic (Step S30). When the user is authorized, the storage device 300 stores the IP address of the client 100 in the user management table 334, and notifies the name of the virtual volume corresponding to the user. The notification is transmitted to the client 100 via the node device 200. The request, such as a read out request of the data from the client 100, is subsequently performed depending on the name of this virtual volume.

The client 100 starts up the boot program 130, which is stored in the ROM (Step S11). Upon completing initialization process required to the boot, the boot program 130 transmits the read out request of the data on the operating system to the node device 200 (Step S12).

The node device 200 receives the read out request and then confirms as to whether or not the data has been cached (Step S20). As discussed in FIG. 7, this confirmation is performed with reference to the physical block management table 234 and the cache management table 232. If the requested data has been judged as cached (Step S20), the corresponding data is read out from the cache block and sent to the client 100 (Step S25). The client 100 receives the corresponding data to continue the start-up process (Step S13).

If the requested data has not been cached (Hereinafter referred to as "non-cached") (Step S20), the node device performs query operation that inquires physical blocks in which the virtual block requested by the client 100 is stored (Step S21). In response to receipt of the query, the storage device 300 refers to the physical block management table 332 and transmits the physical volume number and the block number of the physical block in which the virtual block is stored (Step S31).

The node device 200 stores the information, which is received from the storage device 300, in the physical block management table 234, and reconfirms as to whether or not the data requested by the client 100 has been cached (Step S22). At this point, no data is newly received from the storage device 300 but the physical block management table 234 is updated. Thus, there are some cases that determine the requested data as cached. In one example of possible cases, the client 100 requests the read of the data, which is stored in the share volume. In some cases, the data stored in the share volume has been cached in the node device 200, in response to the read out request by another client. In such a case, the requested data is judged as cached at the moment when the association between the cached data and the requested data becomes clear by obtaining the information about the physical block corresponding to the virtual block, which is selected by new client 100, from the storage device 300. When the requested data is judged as cached (Step S22), the node device 200 sends the cached data to the client (Step S25), and the client receives the data (Step S13).

If the requested data is judged as non-cached regardless of update of the physical block management table 234 (Step S22), the node device 200 requests the storage device 300 to read out the data (Step S23). The storage device 300 reads out the data from the share volume or the specific volume in response to this request, and then sends the data to the node device 200 (Step S32).

Upon receiving the data from the storage device 300, the node device 200 caches the data and updates the cache management table 232 (Step S24). The node device 200 also sends the received data to the client (Step S25) and the client receives the data (Step S13).

As to the above processing, there shows an exemplified case where the data judged as non-cached at step S20 in the node device 200 is determined as cached in step S22 with the update of the physical block management table 234. In FIG. 7, the read out request of the data in the BL0 on the virtual volume VDb, which has been cached in the cache block BL0, is assumed to be received. The node device 200 determines the requested data as non-cached at this point when the data corresponding to the virtual block BL0 on the physical block management table 234a is not managed. The node device 200 then acquires the data on the first row of the physical block management table 234a, that is, the information indicating that the virtual block BL0 is stored in the block BL0 on the physical disk PDc. Upon receiving the data, the node device 200 may determine the requested data as cached in the cache block BO0, with reference to the updated physical block management table 234a and the cache management table 232.

With repetitive process mentioned above, the client 100 may acquire the file required to the boot, and thus completes the remote boot. Although the above embodiment in FIG. 8 regards reading processing at the remote boot, normal process of reading the data regardless of the remote boot may be performed in the same manner; through the process from the read out request of the data (Step S12) to the receipt of the data (Step S13).

In accordance with the computer system of embodiments as discussed above, the data for the remote boot is stored in the share volume, which is shared among the plurality of clients, and is also cached in the node device as shared data among the plurality of clients. This application reduces the moving distance of a reading head on the disk device during reading of the data regardless of the concentration of the plurality of clients on these data, and thus avoids lowering of the reading speed.

F. Modifications (1) In the above embodiment, the node device 200 performs query operation that inquires for the information about the physical block to the storage device 300 once the requested data from the client has been judged as non-cached (Step S20 in FIG. 8). On the other hand, all the data in the physical block management table 332, which is managed by the storage device 300, may be transmitted to the node device 200 in advance. This application enables the node device 200 to judge whether or not the requested data has been cached, without the query to the storage device 300 (Step S21 in FIG. 8).

(2) In accordance with the embodiment, the storage device 300 sends the information about the physical block management table only to the node device 200 that has received the query for the information about the physical block (Step S31 in FIG. 8). It is not, however, restricted but the storage device 300 may multicast the information on the physical block management table for all node devices. This application enables the node device to judge quickly whether or not the requested data has been cached with the effective use of the information, which is received from the storage device 300, even when the user re-logs on with another computer 100 connecting with another node device.

(3) Although the exemplified computer system in embodiments are equipped with the node device, the computer system including the computer, which is directly connected with the storage device, may be applied. Such a computer system requires no processing on node device in FIG. 8. The storage device may send the data referring to the physical block management table 332 (Steps S32 and S13), in response to the request from the client (Step S12). This application avoids lowering of the reading speed by managing the shared data among the plurality of clients in the share volume.

The above embodiment and its modifications are to be considered in all aspects as illustrative and not restrictive. There may be many modifications, changes, and alterations without departing from the scope or spirit of the main characteristics of the present invention.

What is claimed is:

1. A data source device that provides data in response to requests from a plurality of clients comprising:
   a disk drive configured to store the data including a single shared volume with specified capacity that is used in common among all the plurality of clients and a plurality of specific volumes, each of which is associated with one of the plurality of clients;
   a virtual volume management module that allocates a virtual volume to each of the plurality of clients;
   a block mapping management module that manages mapping between a virtual block, which is defined in the virtual volume, and a physical block, which is physically defined in the shared volume and the specific volume;
   a command receiving module that receives a read out command from the client, which involves specification of the virtual block; and
   a read out control module that reads out the data corresponding to the virtual block from the specific volume associated with the client or the shared volume, with reference to the block mapping management module, to be output to the client that has issued the read out command, and
   wherein at a specified time, specific data in the single shared volume for each said plurality of clients is output to each said plurality of clients simultaneously, some of said specific data output being the same for some of said plurality of clients.

2. A data source device in accordance with claim 1, wherein the client is allowed to perform remote boot upon receiving data supplied from the data source device, and wherein the shared volume stores the data provided to the plurality of clients at the remote boot.

3. A data source device in accordance with claim 1, wherein the block mapping management module maps at least part of virtual blocks on the plurality of virtual volumes with the uniform shared block.

4. A data source device in accordance with claim 1, wherein a plurality of node devices having a cache function of the data are connected between the data source device and the plurality of clients, the data source device further comprising:
   a specific information output module that outputs specific information to the node device, the specific information being used to determine the volume in which each data is stored, the shared volume or the specific volume, in response to a request from the node device.

5. A data source in accordance with claim 4, wherein the specific information indicates mapping between the virtual block and the physical block.

6. A data source device in accordance with claim 4, wherein the specific information output module outputs the specific information regarding a plurality of virtual blocks at a predetermined schedule regardless of the read out command.

7. A data source device in accordance with claim 4, wherein the request from the node device includes the specification of the virtual block, and wherein the specific information output module outputs the specific information regarding the specified virtual block.

8. A data source device in accordance with claim 1, which is connected with a predetermined upper data source device and the plurality of clients, and is configured as a node device for relaying supply and receipt of data between them, further comprising:
   a command transmitting module that transmits the read out command of the data to the upper data source device when the data corresponding to the virtual block, which is specified with the read out command from the client, is not stored in the disk device;
   a data receiving module that receives the data and the specific information from the upper data source device, the specific information indicating the volume in which the data is stored, the shared volume or the specific volume;
   a forward module that forwards the received data to the client; and
   a storage control module that stores the received data in the shared volume or the specific volume, depending on the specific information, and updates the mapping between the virtual block and the physical block on the block mapping management module, based on storage location of the received data.

9. A data source device in accordance with claim 8, wherein the specific information is capable of specification regarding commonality of the data between the virtual block and other virtual blocks, the data source device further comprising:
   a specific information request module that requests the upper data source device to output the specific information prior to the transmission of the read out command form the command transmission module,
   wherein the command transmission module judges whether or not the data is stored in the disk device, based on the specific information, which is received from the upper data source device, in response to the output request.

10. A data source device in accordance with claim 8, wherein the specific information is capable of specification regarding commonality of the data between the virtual block and other virtual blocks, the data source device further comprising:
   a specification information management module that acquires and manages the specific information from the upper data source device,
   wherein the command transmission module judges whether or not the data is stored in the disk device, with reference to the specification information management module.

11. A data source device in accordance with claim 10, wherein the specific information management module manages the mapping between the virtual block and the physical block in the upper data source device as the specific information, and wherein the block mapping management module includes a physical block management module that manages mapping between the physical block on the upper data source device and the physical block on the data source device, and specifies the mapping between the virtual block and the physical block on the data source device, with reference to the specific information management module and the physical block management module.

12. A method for controlling a data source device that provides data stored in a disk device in response to requests from a plurality of clients, comprising the steps of:
   managing setting information that defines a single shared volume with specified capacity and a plurality of specific volumes in the disk device, the shared volume being used in common among all the plurality of clients and each said specific volume being associated with one of the plurality of clients;
   allocating a virtual volume to each of the plurality of clients;

managing mapping between a virtual block, which is defined in the virtual volume, and a physical block, which is physically defined in the shared volume and the specific volume;

receiving a read out command, which involves specification of the virtual block from the client; and reading out data corresponding to the virtual block from the specific volume associated with the client or the shared volume, with reference to the block mapping management module, to be output to the client which has issued the read out command, and wherein at a specified time, specific data in the single shared volume for each said plurality of clients is output to each said plurality of clients simultaneously, some of said specific data output being the same for some of said plurality of clients.

13. A computer readable recording media in which a computer program is stored therein to control a data source device that provides data stored in a disk device in response to requests from a plurality of clients, the computer program when executed causes a computer to perform:

managing setting information that defines a single shared volume with specified capacity and a plurality of specific volumes in the disk device, the shared volume being used in common among all the plurality of clients and each said specific volume being associated with one of the plurality of clients;

allocating a virtual volume to each of the plurality of clients;

managing mapping between a virtual block, which is defined in the virtual volume, and the physical block, which is physically defined in the shared volume and the specific volume;

receiving a read out command, which involves specification of the virtual block from the client; and reading out data corresponding to the virtual block from the specific volume associated with the client or the shared volume, with reference to the block mapping management module, to be output to the client which has issued the read out command, and wherein at a specified time, specific data in the single shared volume for each said plurality of clients is output to each said plurality of clients simultaneously, some of said specific data output being the same for some of said plurality of clients.

* * * * *